United States Patent [19]
Cabrol

[11] Patent Number: 4,541,593
[45] Date of Patent: Sep. 17, 1985

[54] AIRCRAFT PROVIDING WITH A LIFT STRUCTURE INCORPORATING MULTIPLE SUPERPOSED WINGS

[76] Inventor: Lucien Cabrol, 12 rue des Carmes, 13200 Arles, France

[21] Appl. No.: 471,059

[22] Filed: Mar. 1, 1983

[30] Foreign Application Priority Data

Mar. 9, 1982 [FR] France .............................. 82 03961

[51] Int. Cl.$^4$ ...................... B64C 39/08; B64C 39/12
[52] U.S. Cl. .................... 244/45 R; 244/123; 244/45 A; 244/91
[58] Field of Search .................... 244/37, 38, 45 R, 46, 244/47, 123, 35 R, 45 A, 13, 91

[56] References Cited

U.S. PATENT DOCUMENTS

| | | | |
|---|---|---|---|
| 1,549,079 | 8/1925 | Folland et al. | 244/35 R |
| 1,558,958 | 10/1925 | Williams | 244/37 |
| 1,650,954 | 11/1927 | Miller | 244/37 |
| 1,802,283 | 4/1931 | Simmonds | 244/35 R |
| 2,075,787 | 4/1937 | Adams | 244/47 |
| 3,695,557 | 10/1972 | Pitts | 244/45 R |
| 3,834,654 | 9/1974 | Miranda | 244/45 R |
| 3,985,317 | 10/1976 | Geraci et al. | 244/45 R |
| 4,090,681 | 5/1978 | Zimmer | 244/45 R |
| 4,365,773 | 12/1982 | Wolkovitch | 244/45 R |

FOREIGN PATENT DOCUMENTS 525387 6/1927 Fed. Rep. of Germany ........ 244/38
157271 4/1922 United Kingdom ................. 244/47

Primary Examiner—Galen L. Barefoot
Attorney, Agent, or Firm—Fisher, Christen & Sabol

[57] ABSTRACT

The invention relates to an aircraft provided on either side of its fuselage with at least one lift structure constituted by at least two wings whose distal ends are connected either to each other or to at least one wing element, each structure forming in front elevation of said fuselage a closed polygon, and comprising an upper wing and a lower wing, the zone of attachment of the latter on the fuselage possibly being offset in the direction of the streamline flow with respect to the zone of attachment of the upper wing. According to the invention, each of the wings is made so that the values of the moment of inertia and of the lift, both varying as a function of the longitudinal distance, each take a maximum value at a zone of the wing other than the root. The invention is more particularly applicable to aircraft with multiple wing elements.

5 Claims, 13 Drawing Figures

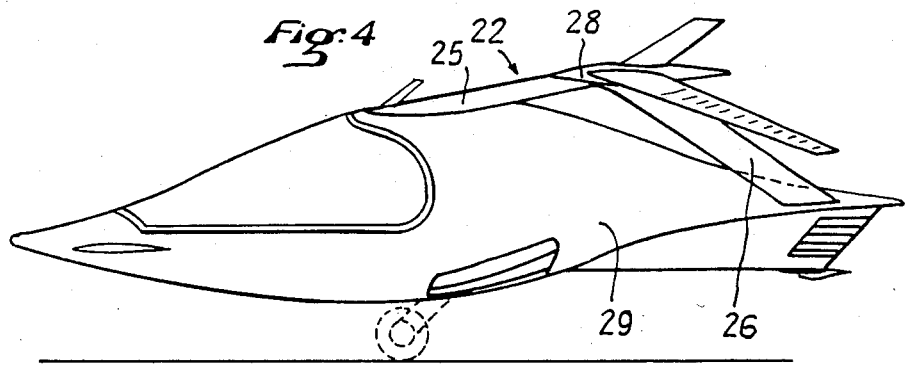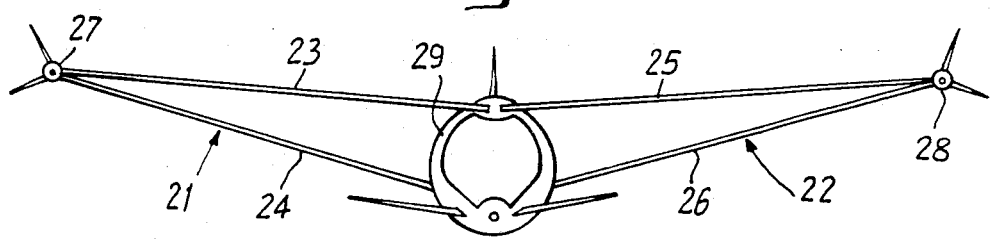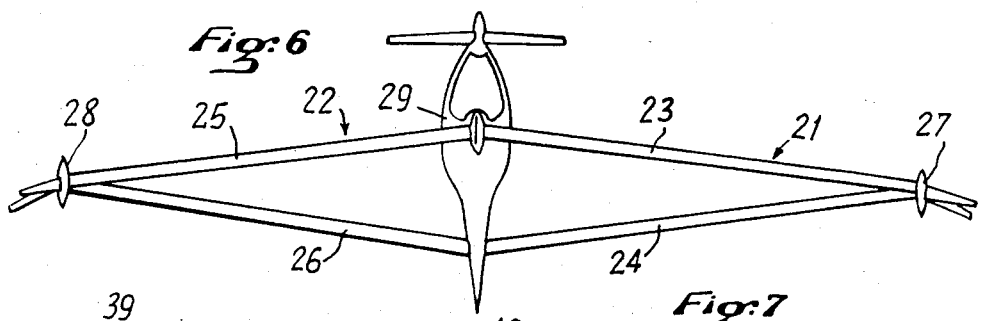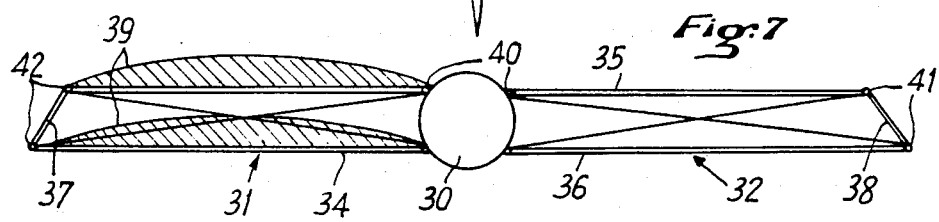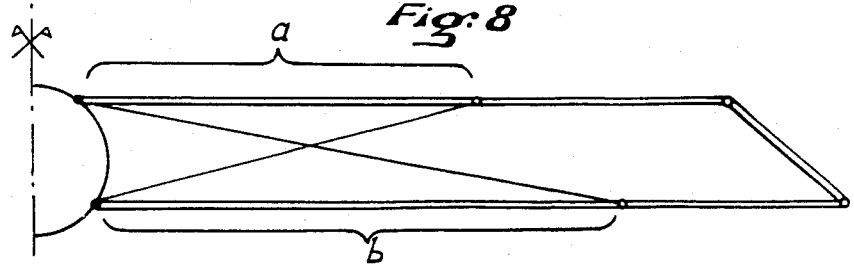

AIRCRAFT PROVIDING WITH A LIFT STRUCTURE INCORPORATING MULTIPLE SUPERPOSED WINGS

BACKGROUND OF THE INVENTION

The present invention relates to an aircraft provided on either side of its fuselage with at least one lift structure constituted by at least two wings whose distal ends are connected either to each other or to at least one wing element, each structure forming in front elevation with the sides of said fuselage a closed polygon, and comprising an upper wing and a lower wing, the zone of attachment of the latter on the fuselage possibly being offset in the direction of streamline flow with respect to the zone of attachment of the upper wing.

It is known that an aircraft wing must present a profile and characteristics which are determined as a function of contradictory imperatives. In fact, it is necessary, among other obligations, to delay the phenomenon of laminar separation, to reduce, or even eliminate, the marginal leaks, and finally to reduce the flow disturbances at the connection of the wing on the one hand to the fuselage and on the other hand to the mobile parts. Now, for a wing profile complying with the first condition mentioned above, the wing aspect ratio makes it possible to solve the difficulties associated with the two conditions mentioned. Nevertheless, this ratio can only be limited, having regard to the dimensions of the aircraft. One solution lies in the fold of the wing on itself, and therefore in the production of structures with superposed multiple wings.

Aircraft provided with such lifting structures incorporating multiple wings are already known.

However, such known aircraft present drawbacks. In fact, the difficulties associated with the lack of rigidity of such structures are solved only by increasing the sections, particularly at the roots, due to the presence of a bending moment appearing at that spot. This increase in the thickness of the wing presents consequences which are detrimental to the weight of such wing elements.

SUMMARY OF THE INVENTION

The present invention overcomes these drawbacks and relates to an aircraft provided on either side of the fuselage with a structure consisting of superposed multiple wings, presenting qualities of resistance, particularly torsional strength, being only slightly deformable, of relative low weight and having the characteristics necessary for producing a streamline flow under the optimum conditions of lift.

To this end, according to the invention, the aircraft provided on either side of its fuselage with at least one lift structure constituted by at least two wings whose distal ends are connected either to each other or to at least one wing element, each structure forming in front elevation with the sides of said fuselage a closed polygon, and comprising an upper wing and a lower wing, the zone of attachment of the latter on the fuselage possibly being offset in the direction of the streamline flow with respect to the zone of attachment of the upper wing, is characterized in that each of the wings is made so that the values of the moment of inertia and of the lift, both varying as a function of the longitudinal distance, each take a maximum value at a zone of the wing other than the root. Each structure advantageously comprises bracing means.

In this way, due to the presence of the bracing means, the strength of the structure at the root of the wings, and therefore the thickness of the wings at that spot, may be reduced. This, together with the fact that the wings are made so that the moment of inertia is maximum elsewhere than at the root, ensures an optimum overall rigidity for a minimum thickness of each wing. The variation in the lift may thus be modulated, not being linked with a maximum at the root. The maximum aerodynamic forces of lift are therefore exerted at a spot where the wing is precisely the strongest. In addition, the rigidity of the structure, due to the bracing means which take up the torsion loads and bending loads, enables high wing aspect ratios to be obtained, accordingly increasing the qualities of lift of the aircraft.

That spot of each wing corresponding to the maximum values of the moment of inertia and of the lift, is preferably located substantially at the centre of the wing considered lengthwise. This arrangement enables the lift and the resistance to the loads to which the wing is subjected, to be homogeneously distributed.

The pattern of variation of the lift and of the moment of inertia as a function of the longitudinal distance may be of any type and determined as a function of needs, provided that it presents a maximum value elsewhere than at the root and preferably near the centre of the wing.

As the torsional and bending stresses are taken up by the bracing means, it is therefore possible to design each structure so that the wings are hinged on the fuselage in rotation in a vertical plane transverse with respect to the streamline flow. A hinged structure is thus obtained which presents characteristics of sufficient rigidity, whilst being constituted by elements of low weight and of reasonable thickness.

More particularly, according to one embodiment, each structure is constituted by two wings whose distal ends are hinged so as to rotate in a plane parallel to the planes of articulation of the wings on the fuselage, so as to constitute an articulated triangle. The distal ends of each wing may in addition be hinged on each other so as to rotate in the same plane. An articulated triangle is thus formed which defines a self-supporting structure of which each element is adapted to take up the forces to which it is subjected, due to its particular profile in which the moment of inertia is maximum at a zone over its length other than the root.

According to a variant embodiment, each lift structure comprises two wings hinged at their distal ends to a wing panel so as to rotate in a vertical plane transverse with respect to the direction of the streamline flow. Said wing panels may further comprise flaps, blades or the like. Similarly, they are adapted to be hinged on the distal ends of the wings, so as to constitute an articulated structure maintained by the bracing means taking up the bending and torsional stresses.

The bracing means are preferably constituted by metal cables.

The bracing means may also be constituted by wing elements performing the role of carrier planes. This arrangement enables the flight qualities of the aircraft to be increased. The wing elements forming braces advantageously present a profile such that the values of the moment of inertia and of the lift varying as a function of the longitudinal distance are maximum at a zone on the wing element corresponding to its centre in the longitudinal direction.

In order to enable the bracing means to perform their role in optimum manner, the cables or wing elements forming the brace are disposed crosswise, and are connected on the fuselage symmetrically so that the points of attachment thereon are placed symmetrically with respect to the longitudinal median plane of said fuselage. In this way, the forces taken up by said means do not cause any unbalance for the aircraft.

The distal end of each of the cables or wing elements forming braces may be connected to the corresponding wing either at the distal end or at a point thereon determined so as to enable the stresses to be adequately taken up.

BRIEF DESCRIPTION OF THE DRAWINGS

The invention will be more readily understood on reading the following description with reference to the accompanying drawings, in which:

FIGS. 4, 5 and 6 are schematic views of a variant embodiment of the aircraft according to the invention, in side, front and plan view, respectively.

FIG. 7 illustrates in front view an embodiment of the aircraft showing the diagram of variation of the moment of inertia as a function of the longitudinal distance.

FIG. 8 shows in partial front view a variant embodiment of the points of attachment of the braces on the wings of a lift structure.

DETAILED DESCRIPTION OF THE INVENTION

Figure 1:
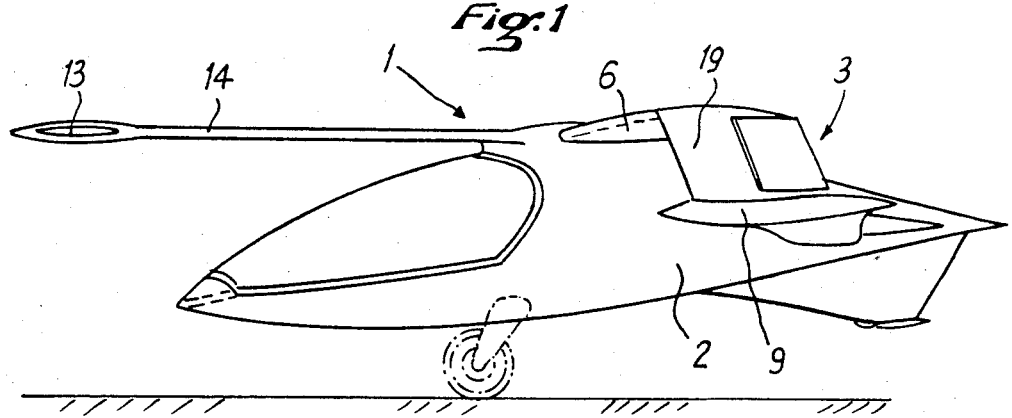
FIGS. 1, 2 and 3 show an embodiment of the aircraft according to the invention, in side view, plan view and front view, respectively.

Referring now to the drawings, the embodiments shown therein relate more particularly to aircraft without self-contained means of propulsion, such as gliders, and of the so-called canard, or tail-first type (i.e. without tail unit but comprising additional flaps or wings at the front). Of course, the invention is in no way limited to this type of aircraft, but is applicable to any aircraft, with or without propulsion means, with or without tail unit.

Figure 2:
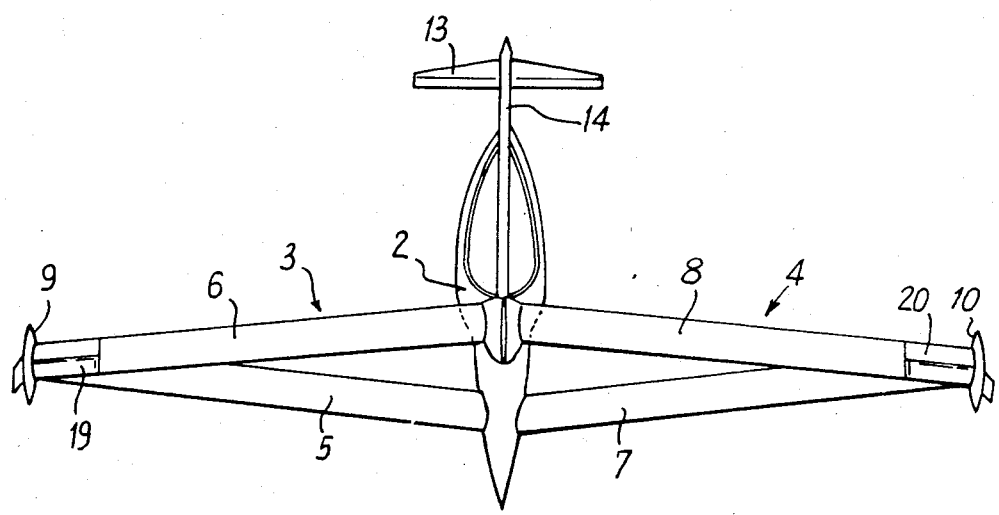
Figure 3:
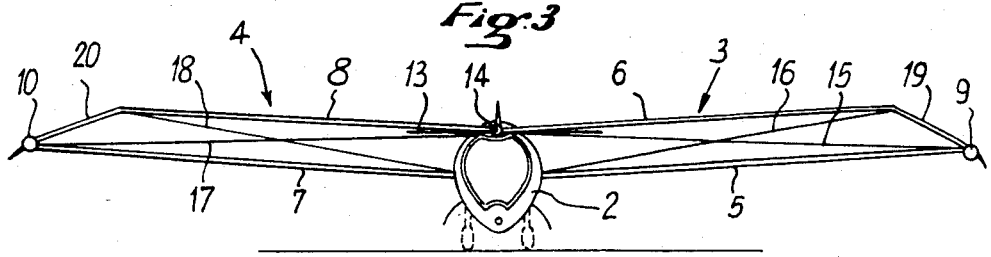

The aircraft 1 shown in FIGS. 1 to 3 comprises a fuselage 2 on either side of which is disposed a lift structure 3, 4. The structures 3 and 4 are identical and each constituted by two lifting wings 5, 6 and 7, 8, respectively. The distal ends of each pair of wings 5, 6 and 7, 8 are connected in two's by respective streamlined bodies 9, 10 provided with additional ailerons 11, 12. The aircraft 1, being of the canard type, comprises a front stabilizer flap 13, disposed in the example of FIGS. 1 to 3, at the end of a mast 14.

Each lift structure 3, 4 comprises a lower wing (5 and 7) and an upper wing (6 and 8). The latter (6 and 8) are connected to the fuselage 2 forwardly in the direction of streamline flow, with respect to the lower wings 5 and 7, in the example of these Figures.

The aircraft comprises bracing means constituted by metal cables 15, 16 for structure 3 and 17, 18 for structure 4. Each of said cables is connected to the fuselage 2 and to the distal end of each wing. The bracing means make it possible to take up the bending and torsional stresses imposed on the wings of each structure.

According to the embodiment of FIGS. 1 to 3, the upper wings 6 and 8 are curved at their distal ends to form a lateral oblique panel 19, 20 connected to the respective streamlined bodies 9 and 10.

FIGS. 4, 5 and 6 show a variant embodiment in which each lift structure 21 (and 22) is constituted by a lower wing 24 (26) and an upper wing 23 (25), connected at their distal end by a streamlined body 27 (and 28) thus forming, with the side of the fuselage 29, in front elevation, a triangle (cf. FIG. 5). By comparison, the example of FIG. 3 shows lift structures in trapezium form.

FIG. 7 schematically shows in front elevation an aircraft provided with a fuselage 30 and two structures 31 and 32 each composed of two wings 33, 34 and 35, 36 connected in two's at their distal end by a lateral panel 37, 38.

Each wing presents a structure studied and designed so that its moment of inertia, varying as a function of the longitudinal distance, presents a maximum at the centre thereof. Curves 39 schematically and symbolically represent this variation of the moment of inertia of each wing 33 and 34. Similarly, the variation (not shown) of the value of the lift of each wing as a function of the longitudinal distance presents a maximum substantially at the centre of the wing. In this way, an adequate distribution is obtained both for taking up the stresses to which the wing is subjected and as far as the characteristics of lift are concerned.

The bracing cables taking up the torsional and bending stresses to ensure the rigidity of each structure, it is therefore possible to connect the wings to the fuselage, as well as the distal ends of the wings to each other, in hinged manner. The articulations, symbolized in FIG. 7 by points 40, 41, 42, are made in the vertical plane of FIG. 7, i.e. transverse with respect to the direction of streamline flow. An articulated structure is thus obtained. The connections between the fuselage and the wings and between the wings themselves, of the embodiments of FIGS. 1 to 6, may of course be constituted by articulations of this type.

According to the embodiment of FIGS. 1, 2, 3 and 7, it is obviously necessary to provide bracing means if the wings are hingedly mounted on the fuselage and on each other. These means are not necessary in the embodiment of FIGS. 4, 5 and 6, since the triangular articulated structure obtained is in equilibrium, constituting a self-supporting structure.

The point of attachment of the bracing cables on the wings may be disposed at the distal ends of the wings or at another point thereon, as shown in FIG. 8. The distances a and b are calculated as a function of the imperatives connected with the geometry of the structure. The bracing cables may be crosswise or disposed in any other manner.

Figure 9:
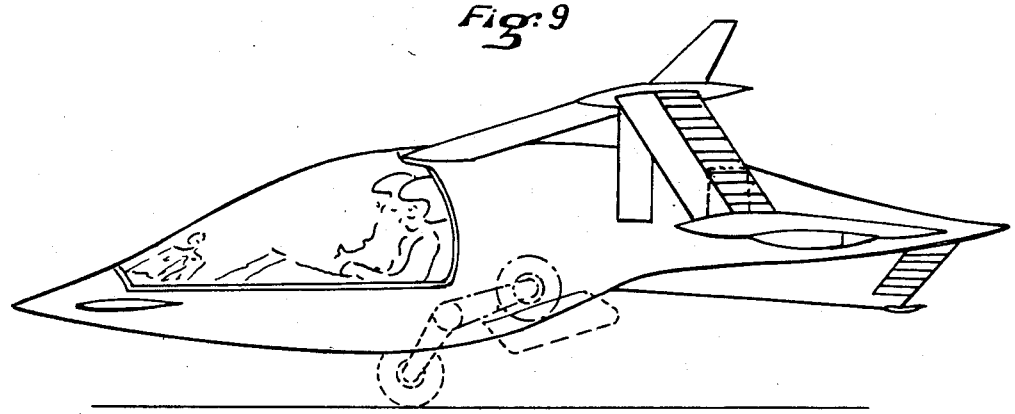
FIGS. 9, 10 and 11 are schematic views of a second variant embodiment, in side, plan and front view respectively.
Figure 10:
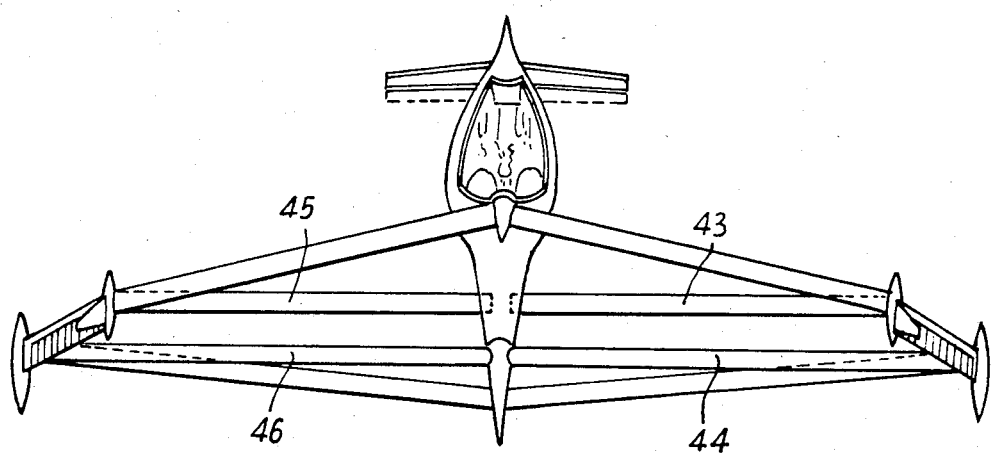
Figure 11:
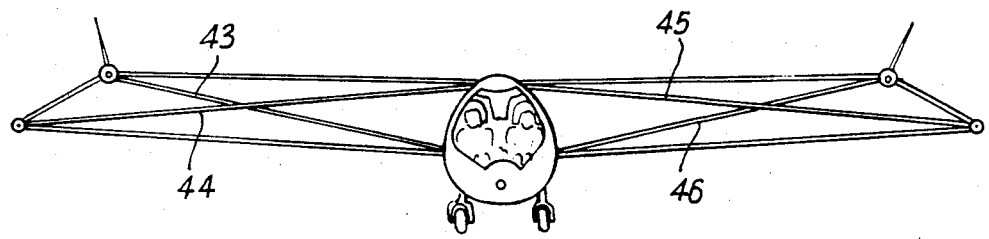

FIGS. 9, 10 and 11 show a variant embodiment in which the bracing means are constituted by wing elements 43, 44 and 45, 46 forming carrier planes. The braces thus formed of wing elements preferably have such a profile that they present the same characteristics as the wings, namely longitudinal variations of the moment of inertia and of the lift presenting a maximum value at their centre.

Each brace, cable or wing element is connected on the fuselage symmetrically, so that the points of attachment of each brace are disposed in pairs symmetrically with respect to a longitudinal median plane. This arrangement ensures adequate distribution of the torsional and bending stresses taken up by said braces.

In the event of the structures being rigid, i.e. when the wings do not present a degree of freedom with respect to the fuselage and/or to the wing end panels, or when their inherent rigidity is too great despite the articulation of their attachments, it may be advantageous to provide elastic suspension means allowing a limited relative movement of each wing or of a each cable with respect to the fuselage.

These elastic suspension means are for example constituted by a cylinder in which a piston (fast with a rod connected either to the wing or to the corresponding brace) is adapted to move against a spring, for example, deformable for a given force. The chamber of the cylinder may also be connected to a hydraulic or mixed air-liquid pressure circuit.

In this way, each wing or brace, connected to the fuselage via elastic suspension means, is capable of moving to a limited extent when the forces exceed a predetermined value corresponding to the hydraulic pressure and/or the force of deformation of the spring. A slight deformation of the structure is thus obtained, which avoids the wings and braces undergoing excessive stresses without substantially reducing the rigidity of the wing structure.

The wings and the braces of each structure generally being fixed on the same straight line transverse with respect to advance, it is advantageous to provide a double cylinder provided with two chambers (one for each wing attachment disposed symmetrically on the fuselage) each provided with a piston, a rod, a spring and/or connected to a hydraulic pressure circuit.

The Figures show aircraft in which the zone of attachment of the upper wings of each structure is disposed forwardly of the zone of attachment of the lower wings. Of course, these respective zones of attachment may equally well be located either in the same vertical plane transverse with respect to advance, or one to the rear of the other (the arrangement shown in the Figures reversed).

Figure 12:
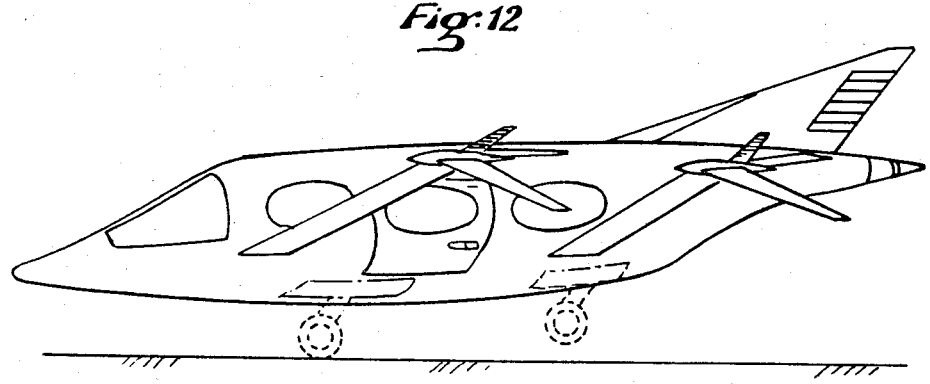
FIGS. 12 and 13 show an aircraft provided with doubled structures, in side view and in plan view.
Figure 13:
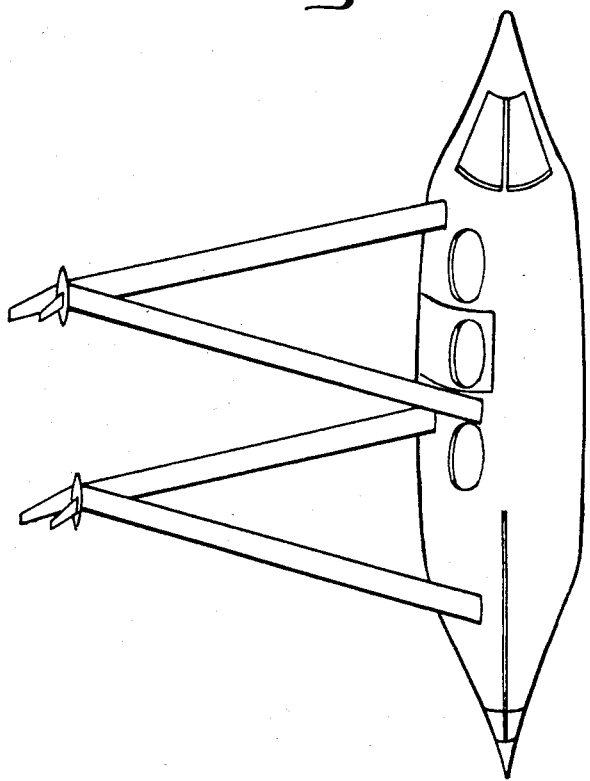

FIGS. 12 and 13 show, in side and partial plan view respectively, a variant embodiment of an aircraft provided with two structures on either side of the fuselage, disposed in zones of attachment each offset in the longitudinal direction. This configuration is suitable for relatively large size aircraft and thus conserves the advantages brought by the invention.

What is claimed is:

1. An aircraft, comprising in combination:
   a fuselage having two sides;
   including on each said side of said fuselage at least one lift structure constituted by at least an upper wing and a lower wing, each said wing being connected at one end thereof to the fuselage and at the other end to at least one wing element, such that each lift structure forms in front elevation with the side of the fuselage a closed polygon;
   each said wing being hingedly secured to said fuselage and to a portion of said element so as to form a semi-rigid embedding, allowing small rotations of each wing in a vertical plane containing the median line of each respective said wing; and
   each of said upper and said lower wings being of such structure that the values of the moment of inertia, varying as a function of the longitudinal distance, take a maximum value at a generally central zone of each of said upper and said lower wings.

2. The aircraft of claim 1, wherein each said lift structure comprises said upper and lower wings so as to form, in front elevation, a triangle formed along one side by the fuselage, along another side by said upper wing, and along the remaining side by said lower wing, each of said upper and lower wings having a distal end; said distal ends being hingedly connected so as to permit rotation of said upper and lower wings in a vertical plane connecting the median line of each respective said wing.

3. The aircraft of claim 1, wherein each lift structure comprises said upper and lower wings each having a distal end; said upper and lower wings being hingedly connected respectively at their distal ends to first and second ends of a wing panel so as to permit rotation of said upper and lower wings in a vertical plane containing the median line of each respective said wing.

4. The aircraft of claim 1, further comprising a means for bracing including wing elements, wherein said wing elements are formed such that the values of the moment of inertia vary as a function of the longitudinal distance along each said wing, and are maximum at a zone of each said wing corresponding to its center in the longitudinal direction.

5. The aircraft of claim 1, wherein each said lift structure further comprises a first relatively rigid cable in tension connecting said first end of said wing panel at its connection to said lower wing; and a second relatively rigid cable in tension connecting said second end of said wing panel at its connection to said lower wing to the fuselage at its connection to said upper wing;
   said wings being formed such that the values of the moment of inertia vary as a function of the longitudinal distance along each said wing, and are maximum at a zone of each said wing corresponding to its center in the longitudinal direction.

* * * * *